E. D. SPICER.
SELF OILING BEARING.
APPLICATION FILED OCT. 31, 1916.

1,244,914.

Patented Oct. 30, 1917.

Inventor
Elmer D. Spicer,
By W. Schoenborn.
Attorney

UNITED STATES PATENT OFFICE.

ELMER D. SPICER, OF WELLSVILLE, NEW YORK, ASSIGNOR TO MOORE STEAM TURBINE CORPORATION, OF WELLSVILLE, NEW YORK, A CORPORATION OF NEW YORK.

SELF-OILING BEARING.

1,244,914.

Specification of Letters Patent.

Patented Oct. 30, 1917.

Application filed October 31, 1916. Serial No. 128,733.

*To all whom it may concern:*

Be it known that I, ELMER D. SPICER, a citizen of the United States, residing at Wellsville, in the county of Allegany and State of New York, have invented certain new and useful Improvements in Self-Oiling Bearings, of which the following is a specification.

My invention relates to self-oiling bearings and is particularly adapted for the lubrication of shafts of steam turbines, electric motors and other high speed apparatus.

The primary object of the invention is to provide a simple and efficient means for automatically supplying oil in copious quantities to bearings of rapidly rotating shafts so as to reduce the friction loss and wear to the minimum, and prevent overheating of the bearing.

Other objects and advantages of the invention will appear from the detailed description and mode of operation.

The invention consists of structural features and relative arrangements of the several elements which will be hereinafter more fully described and particularly pointed out in the appended claims.

In the drawings, in which similar reference characters indicate the same parts in the several figures of drawing.

Figure 1:
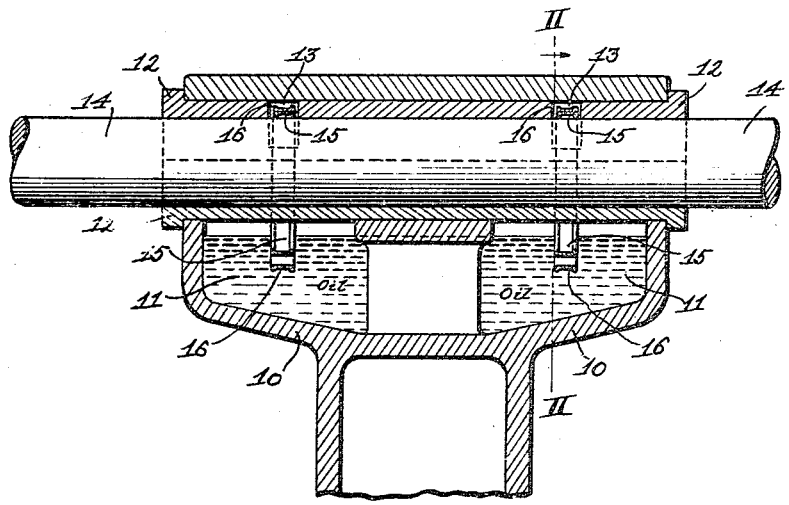
Figure 1 is a longitudinal section of a bearing having the invention applied thereto.
Figure 2:
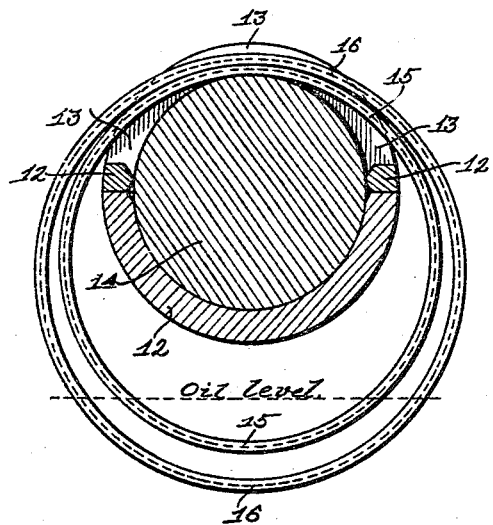
Fig. 2 is an enlarged transverse section on the line II—II of Fig. 1, the bearing housing being omitted.
Figure 3:
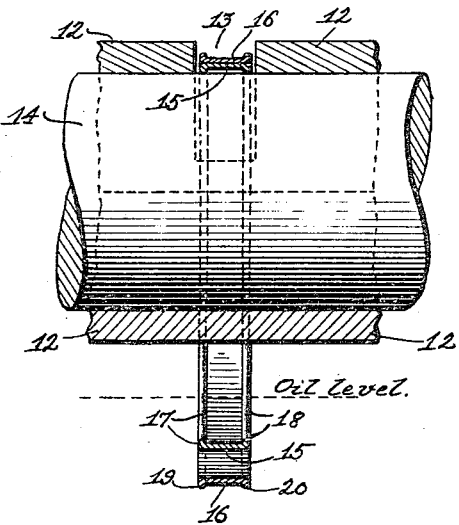
Fig. 3 is an enlarged fragment of Fig. 1.

Referring to the drawings 10 indicates a bearing housing which may be of any preferred form, but which should contain a reservoir for a body of lubricating oil, indicated at 11. The housing 10 is provided with the bearing proper, which is indicated at 12, and which may also be of any preferred form. The bearing 12 should, however, have one or more transverse slots in its top half to receive the lubricating rings which will be hereinafter described in detail. Supported in the bearing 12 is the shaft 14 which may be the shaft of a turbine, electric motor or other apparatus.

Supported on the shaft 14 in each of the slots 13 is a set of oiling rings which are the essential feature of the present invention. Each set of oiling rings comprises a plurality of superposed rings of different size, two rings, 15 and 16, being shown in the drawings in each set. It will be understood, however, that more than two rings may be employed without departing from the gist of my invention. The rings 15 and 16 are independent and both dip into the oil 11 in the bearing reservoir.

In the preferred form the rings are substantially cylindrical bands which contact with each other above the shaft 14, the inner ring 15 resting directly on the shaft. I also prefer to have the bands of substantially the same width and provide the inner one with internal marginal flanges 17 and 18. I also prefer to provide the outer ring or band 16 with external marginal flanges 19 and 20.

The operation of the invention is as follows: The rotation of the shaft 14 causes the rings 15 and 16 to rotate and on account of both rings dipping into the oil, they will both carry oil to the top of the shaft 14. The flanges 17 and 18 on the ring 15 prevent the oil from spreading out laterally on the interior of the ring and flowing off the edges and therefore will enable the ring to carry a larger quantity of oil to the shaft 14 than would be possible without these flanges. The flanges 17 and 18 also stiffen the ring 15, the flanges 19 and 20 on the ring 16 serving a similar purpose. On account of the contact between the rings 15 and 16 above the shaft 14, the oil on the outer surface of the ring 15 and the inner surface of ring 16 will be squeezed out laterally and flow into the bearing 12, it being evident that the bearing 12 will thus receive oil in much greater quantities than in the case of prior constructions in which the oil is carried up from the reservoir by a single ring.

While I have illustrated a bearing in which two sets of oiling rings are employed it will be evident that the number of sets will vary with different bearings and be determined by the requirements of each particular application of the invention.

What I claim is:

1. A self-oiling bearing comprising, in combination with the bearing block, a rotary shaft supported therein and an oil reservoir, a plurality of independent rings, each of which rings is substantially rectangular in cross section and loosely carried and rotated by said shaft and dipping into the oil in said reservoir, said rings being in superposed arrangement and in contact throughout their width above said shaft.

2. A self-oiling bearing comprising, in combination with the bearing block, a rotary shaft supported therein, and an oil reservoir, a plurality of independent substantially cylindrical bands carried and rotated by said shaft and dipping into the oil in said reservoir, said bands being in superposed arrangement and in contact above said shaft.

3. A self-oiling bearing comprising, in combination with the bearing block, a rotary shaft supported therein and an oil reservoir, a plurality of independent rings of different size, each of which rings is substantially rectangular in cross section and in superposed arrangement throughout their width and loosely carried and rotated by said shaft and dipping into the oil in said reservoir.

4. A self-oiling bearing comprising, in combination with the bearing block, a rotary shaft supported therein and an oil reservoir, a substantially cylindrical band carried and rotated by said shaft and dipping into the oil in said reservoir, said band having internal marginal flanges which contact with the shaft, and an independent ring superposed on said band and dipping into the oil in said reservoir.

5. A self-oiling bearing comprising in combination with the bearing block, a rotary shaft supported therein and an oil reservoir, a plurality of superposed independent substantially cylindrical bands carried and rotated by said shaft and dipping into the oil in said reservoir, the inner band having internal marginal flanges and the outer band having external marginal flanges.

6. A self-oiling bearing comprising, in combination with the bearing block, a rotary shaft supported therein and an oil reservoir, a plurality of superposed independent substantially cylindrical bands of the same width carried and rotated by said shaft and dipping into the oil in said reservoir, said rings being in eccentric relation and contacting above said shaft and the inner ring having internal marginal flanges and the outer ring having external marginal flanges.

In testimony whereof, I affix my signature.

ELMER D. SPICER.

Copies of this patent may be obtained for five cents each, by addressing the "Commissioner of Patents, Washington, D. C."